Patented Mar. 28, 1950

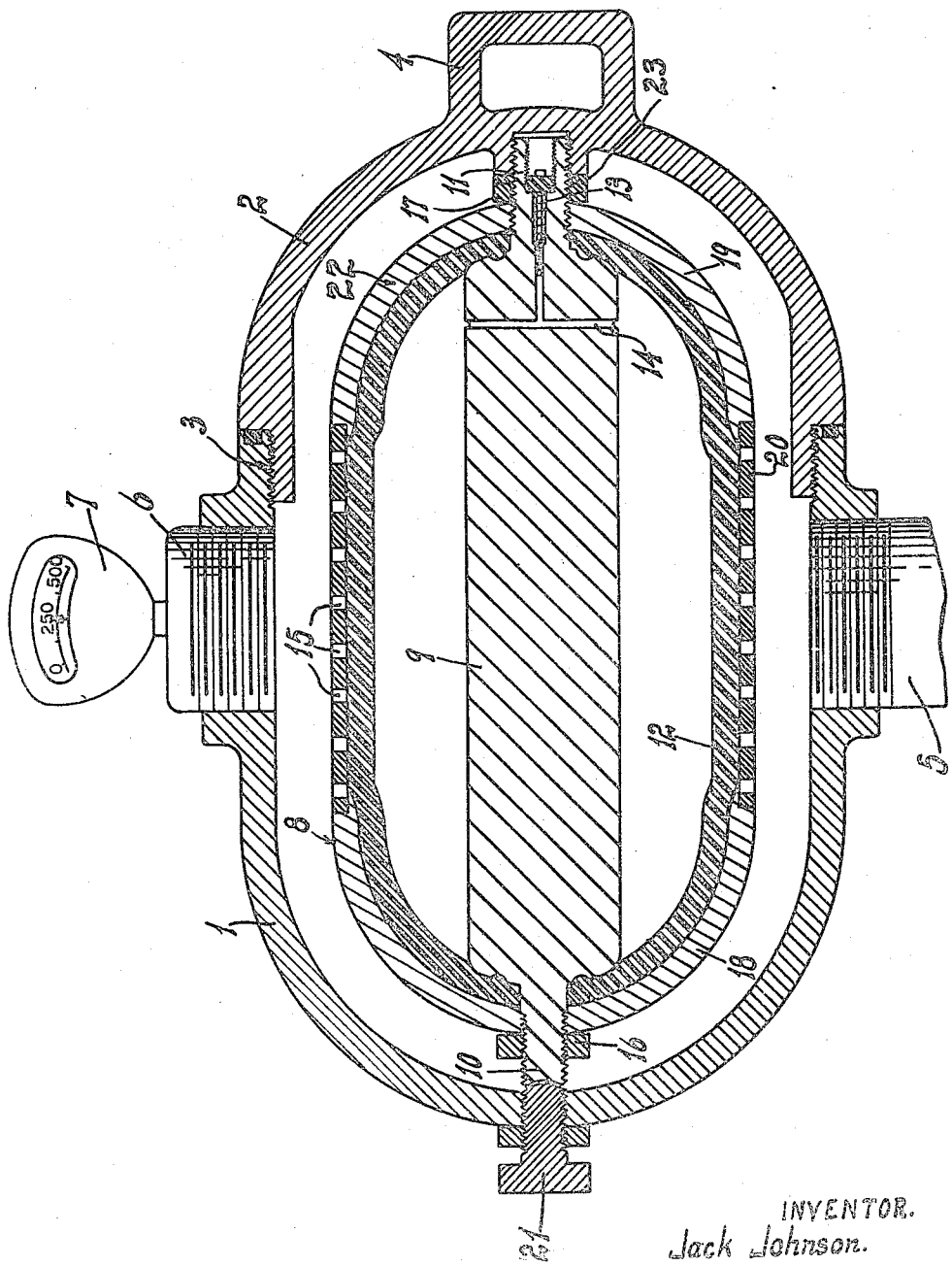

2,501,773

UNITED STATES PATENT OFFICE 2,501,773

SURGE DAMPER FOR HYDRAULIC SYSTEMS

Jack Johnson, Long Beach, Calif., assignor to Lou Son Development Co., Long Beach, Calif., a corporation of California Application May 14, 1946, Serial No. 669,494

4 Claims. (Cl. 138—30)

This invention relates to a surge damper for hydraulic systems whereby the surge or impulses or hydraulic shocks of a hydraulic system are absorbed or damped, and particularly the surge or impulses caused by the pump.

An object of my invention is to provide a surge damper wherein the hydraulic fluid under pressure is caused to circulate around a yieldable diaphragm or bag, thus exerting pressure over substantially the entire circumference of the diaphragm.

Another object of my invention is to provide a novel surge damper of the character stated in which the yieldable diaphragm is substantially cylindrical in form and the diaphragm being inflated or expanded by air or gas pressure.

Another object of my invention is to provide a surge damper in which the entire diaphragm unit may be quickly and easily removed and replaced, when necessary.

A feature of my invention resides in the novel construction of my surge damper wherein a plurality of surge damping units may be arranged in sequence if high pressures are encountered, in the hydraulic system.

Other objects, advantages and features of invention may appear from the accompanying drawing, the subjoined detailed description, and the appended claims.

The drawing is a longitudinal, sectional view of my surge damper.

Referring more particularly to the drawing, the numeral 1 indicates a housing, one end of which is open and the open end closed by a cap 2, which is threaded onto the housing 1 as shown at 3. The complete housing assembly is thus somewhat cylindrical in form or may be described as elliptical in longitudinal section. A handle 4 on the cap 2 enables the cap to be threaded onto the housing and also permits this cap to be easily handled.

My surge damper is arranged in a hydraulic system so that the fluid in this system can enter the housing 1 and this is accomplished by a pipe 5, which screws into the housing 1, this pipe extending into the pressure line of the hydraulic system. Particularly my surge damper is used in the drilling of oil wells where drilling mud is pumped under high pressure into the well while the drilling operations continue. The drilling mud is pumped into the well under high pressure from a suitable pump, and the pipe 5 extends into the pressure line which leads into the well.

At the top of the housing 1, I provide a plug 6, which contains a pressure gauge 7. If the fluid pressures of the hydraulic system are high and one unit of the surge damper will not suffice, then one or more units may be superimposed on the first unit by removing the plug 6, and by providing a short pipe which extends from one damper unit to another. In this manner, the pressures are distributed between a plurality of units.

The diaphragm may be disposed in a removable unit 8 preferably in cartridge form including a solid mandrel 9. A threaded pin 10 extends from one end of the mandrel 9, and a second threaded pin 11 extends from the other end of the mandrel. A diaphragm 12 of cylindrical or bag shape may be formed of rubber or yieldable plastic and is mounted on the mandrel 9, and when the diaphragm is not inflated, it closely surrounds the mandrel. In the drawing, the bag is shown in its inflated position. A valve 13 is mounted in the pin 11, and this valve checks the air going into the port 14, which port opens into the diaphragm 12. Air or gas under pressure is forced through the valve 13, and the port 14, and inflates the diaphragm 12, as shown. A cage 22 including end bells 18 and 19 and a cylinder 20 surrounds the mandrel 9 and is mounted thereon, and the diaphragm, when inflated, presses against the inside of the cage, substantially as shown in the drawing. The cylinder 20 is perforated, as shown at 15, so that the fluid, under pressure, can press against the bag, causing the same to collapse or partially collapse against the pressure within the bag. The perforations 15 are arranged circumferentially in the cage 22, and thus permit the hydraulic fluid to press against substantially the entire external surface of the bag 12.

The cage 22 is assembled on the mandrel 9 by means of the nuts 16 and 17, which screw onto the pins 10, 11 respectively, and hold the end bells 18 and 19 of the cage 22 on the perforated cylindrical sleeve 20. It is thus possible to assemble the cage on the mandrel, and the end bells 18, 19 also press against the ends of the cylindrical diaphragm 12, thus holding the ends of the diaphragm against the ends of the mandrel, and preventing leakage of air or gas when the diaphragm is inflated.

The mandrel 9 is held in the housing 1 in the following manner:

A set screw 21 is threaded through the end of the housing 1 and bears against the end of the pin 10. The cap 2 screws onto the end of the pin 11, thus centering the cartridge 8 in the housing. A gasket 23 may be compressed between the nut 17 and the cap 2 so as to seal off the air valve 13 from contamination by the liquid being damped. The diaphragm 12 is inflated to the proper pressure before the entire cartridge assembly is assembled in the housing 1. Thereafter, it is seldom necessary to repressurize the diaphragm or bag 12. If the diaphragm unit is injured in any manner, the cap 2 is removed and the entire diaphragm unit can then be removed from the housing for purposes of repair or replacement.

While my invention has been described with reference to a presently preferred embodiment, I do not limit myself to this embodiment, since I include within the true spirit and scope of my invention all similar and equivalent structures.

Having described my invention, I claim:

1. A diaphragm cartridge adapted to be inserted in a surge damper housing comprising: a multi-piece cage; a mandrel extending longitudinally of the cage; a resilient cylinder disposed in the cage between the mandrel and the cage; and means securing the mandrel and cage together, whereby the ends of the cylinder may be pinched between the cage and the mandrel to retain the cylinder within the cage.

2. A diaphragm cartridge adapted to be inserted in a housing comprising: a mandrel threaded at either end; apertured end bells adapted to be passed over the threaded ends of the mandrel to define a cage; an inflatable bag disposed within the cage exterior of the mandrel; and means for inserting a gas under pressure into the interior of the inflatable bag.

3. A surge damper comprising: a housing having a fluid inlet and having a main portion and a removable cap with thread means on the inner surface thereof; a diaphragm cartridge insertable within the housing and including an inflated bag and thread means on one end; and centering means carried by the main housing portion, whereby the cartridge may be rigidly secured within the housing by engagement of the thread means with the threaded portion of the cap, and also by contact of the centering means with the cartridge.

4. A surge damper for hydraulic systems comprising: a stationary housing member having a fluid inlet; a housing cap adapted to be removably secured to the stationary housing member and having a tapped boss on the inner surface thereof; a mandrel threaded on both ends and adapted to be threaded into the tapped boss of the housing cap; a cage mounted on the mandrel and including end bells and a cylindrical perforated central portion; a resilient bag pinched between the ends of the mandrel and the end bells; a passage extending through one threaded end of the mandrel to the interior of the bag; a valve disposed in the passage so that air inserted within the bag may be retained therein; a gasket disposed between the mandrel end threaded to the housing cap and the housing cap to prevent leakage of hydraulic fluid to the valve; and a centering screw extending through the main housing portion to contact the other end of the mandrel to thereby center the mandrel and the portions attached thereto which define a removable cartridge.

JACK JOHNSON.

REFERENCES CITED

The following references are of record in the file of this patent:

UNITED STATES PATENTS

| Number | Name | Date |
|---|---|---|
| 345,253 | Northey | July 6, 1886 |
| 381,731 | Walker | Apr. 24, 1888 |
| 2,278,688 | Caminez | Apr. 7, 1942 |
| 2,290,337 | Knauth | July 21, 1942 |
| 2,448,118 | Pelletters | Aug. 31, 1948 |

FOREIGN PATENTS

| Number | Country | Date |
|---|---|---|
| 17,403 | Great Britain | Aug. 6, 1896 |